United States Patent [19]

Gustafson et al.

[11] 4,289,793
[45] Sep. 15, 1981

[54] METHOD OF MAKING CHEESE

[75] Inventors: Leon D. Gustafson; Wayne C. Mielke, both of Marshfield, Wis.

[73] Assignee: Land O'Lakes, Inc., Arden Hills, Minn.

[21] Appl. No.: 148,990

[22] Filed: May 12, 1980

Related U.S. Application Data

[62] Division of Ser. No. 1,598, Jan. 8, 1979.

[51] Int. Cl.³ ............................................. A23C 19/05
[52] U.S. Cl. ...................................... 426/491; 99/458; 100/107; 425/84; 425/85; 426/414; 426/478; 426/515; 53/438
[58] Field of Search ......................... 99/458, 456, 457; 426/8, 36, 41, 478, 491, 495, 515, 512, 517, 414, 130; 100/110, 116, 104, 107, 108, 109, 115, 124; 425/84, 85; 53/438

[56] References Cited

U.S. PATENT DOCUMENTS

| | | | |
|---|---|---|---|
| 32,820 | 7/1861 | Codding | 100/116 |
| 65,211 | 5/1867 | Greene | 99/458 |
| 216,075 | 6/1879 | Wiselogel | 100/107 |
| 537,226 | 4/1895 | Ohl | 99/458 |
| 626,646 | 6/1899 | Baggett | 100/197 |
| 706,104 | 8/1902 | Piggott | 100/124 |
| 709,319 | 9/1902 | Hankins | 99/458 |
| 929,384 | 7/1909 | Brown et al. | 100/115 |
| 1,031,543 | 7/1912 | Franke | 100/107 |
| 1,259,843 | 3/1918 | Fitzgerald | 100/116 |
| 1,418,242 | 5/1922 | Fieldman | 100/116 |
| 1,566,496 | 12/1925 | Maus | 100/110 |
| 2,423,300 | 7/1947 | Faehndrich | 426/478 |
| 2,494,638 | 1/1950 | Stine | 99/458 |
| 2,538,403 | 1/1951 | Watson | 100/211 |
| 2,622,778 | 12/1952 | Poland | 100/268 |
| 2,851,776 | 9/1958 | Czulak et al. | 99/458 |
| 3,032,877 | 5/1962 | Collins | 99/458 |
| 3,100,712 | 8/1963 | Meeker et al. | 99/458 |
| 3,140,185 | 7/1964 | Pinckney | 426/478 |
| 3,221,407 | 12/1965 | Jagoueix | 99/458 |
| 3,355,805 | 12/1967 | Krueger et al. | 99/458 |
| 3,404,009 | 10/1968 | Lambert et al. | 426/478 |
| 3,468,026 | 9/1969 | Robertson et al. | 426/491 |
| 3,541,686 | 11/1970 | Koopmans | 426/491 |
| 3,592,127 | 7/1971 | Cooley | 100/107 |
| 3,675,570 | 7/1972 | Mersfelder | 100/108 |
| 3,744,405 | 7/1973 | Loichinger | 31/48 |
| 3,822,361 | 7/1974 | Irvine | 426/491 |
| 3,859,453 | 1/1975 | Bronkhorst et al. | 426/491 |
| 3,891,783 | 6/1975 | Robertson et al. | 426/478 |
| 3,969,995 | 7/1976 | Krueger et al. | 99/458 |
| 4,018,145 | 4/1977 | Hensel | 99/458 |
| 4,157,680 | 6/1979 | Charles | 99/458 |

FOREIGN PATENT DOCUMENTS

| | | | |
|---|---|---|---|
| 708 | 6/1915 | Austria | 100/107 |
| 327453 | 12/1902 | France | 100/107 |
| 448302 | 1/1913 | France | 100/107 |
| 592298 | 4/1959 | Italy | 100/107 |

Primary Examiner—Steven L. Weinstein
Attorney, Agent, or Firm—Kinney, Lange, Braddock, Westman & Fairbairn

[57] ABSTRACT

Large blocks of cheese are formed in a container having a removable bottom, side walls, and an essentially open top. A plurality of upstanding perforated tapered posts extend from the removable bottom to essentially the desired final height of the cheese block. The posts are longitudinally and laterally spaced from one another so that the curd surrounds each post when the container is filled with curd. Pressure is then applied downward to the curd in the container which compacts the curd and causes draining of whey through the upstanding perforated posts. After the curd has been compacted to the desired height, and the whey has been drained through the upstanding perforated posts, the container is inverted and the tapered posts are withdrawn. Pressure is again applied to cause the curd surrounding each perforated post to knit together and aid in removal of any additional whey, thereby providing a cheese block of uniform texture.

3 Claims, 11 Drawing Figures

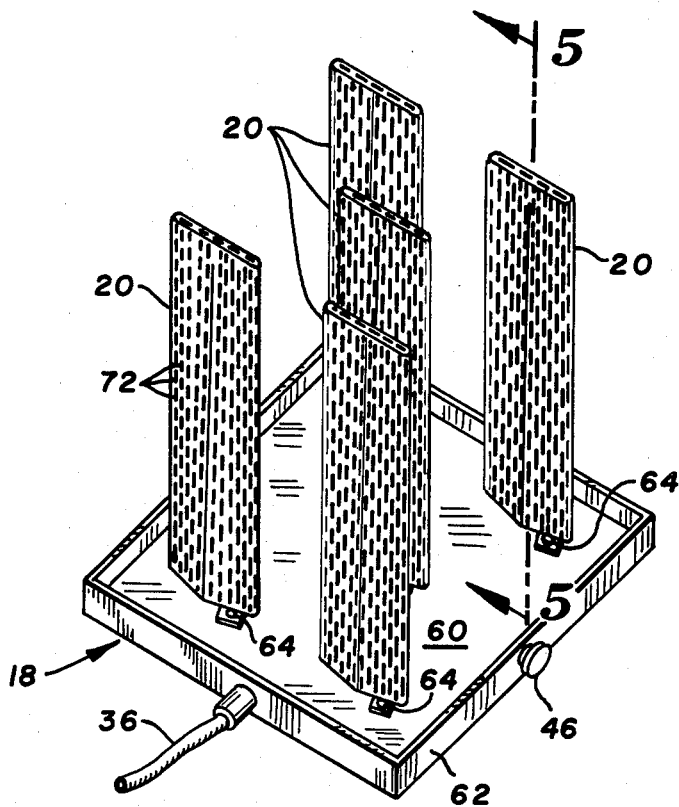
*FIG. 4*
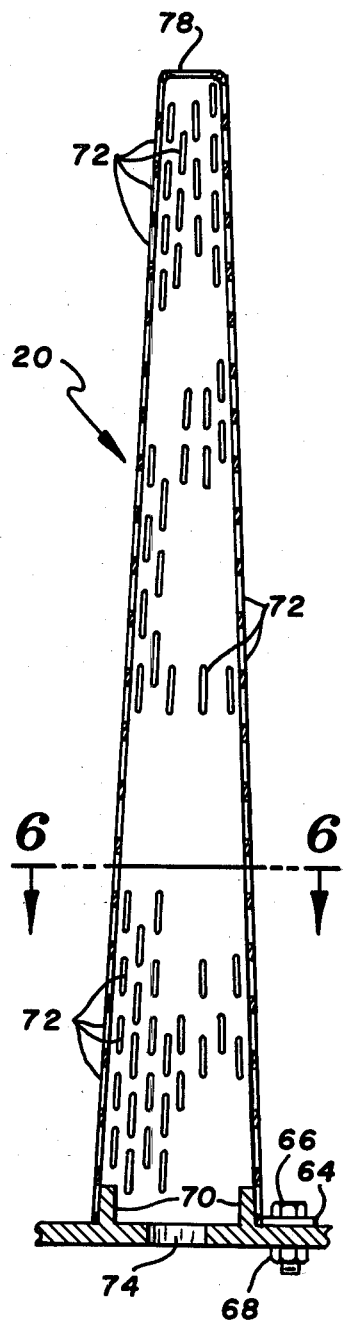
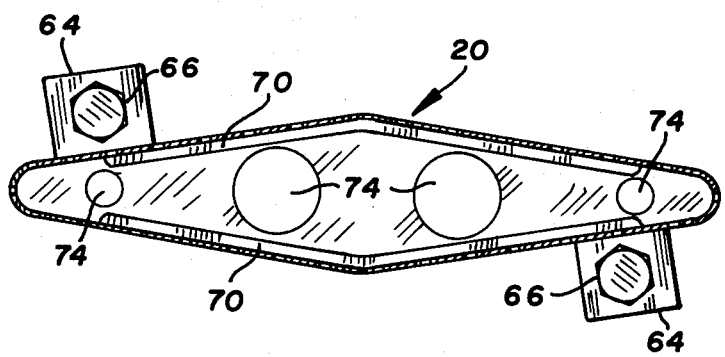
*FIG. 6*  *FIG. 5*

METHOD OF MAKING CHEESE

This is a division of application Ser. No. 1,598, filed Jan. 8, 1979.

BACKGROUND OF THE INVENTION

1. Field of the Invention

The present invention relates generally to cheese making. In particular, the present invention is an improved apparatus and method for production of large size blocks of natural cheese.

2. Description of the Prior Art

Natural cheese is generally manufactured by coagulating or curdling milk and cooking the resulting curd. The whey is drained from the curd, and the curd is collected and compressed. Further whey removal is achieved during the compressing stage. The compressed curd is then cured to provide the desired flavor, aroma and texture.

It has become very desirable to produce large rectangular blocks of natural cheese which may weigh as much as six to seven hundred pounds. These large blocks are subsequently subdivided into smaller consumer size blocks and packaged. The production of large blocks and later subdivision into smaller blocks results in less waste during the cheese manufacturing process, and is well adapted to large scale production.

In producing large blocks of cheese, it is necessary to maintain moisture content uniformly throughout the block. This requires draining of the whey from the curd during the compression of the curd.

One method which has been proposed for whey removal during the manufacture of large size blocks of cheese is described in U.S. Pat. Nos. 3,969,995 and 4,049,838 by Krueger and Leitner. In these patents, an open top container has a removable bottom with V shaped blades extending upward. The curd is filled into the container and a top plate having similar V shaped blades is pressed downward to compress the curd. The V shaped blades attached to both top and bottom plates are perforated to permit drainage of whey. The draining is achieved by turning the container with the blades inserted by ninety degrees and holding the container in this position for a period of time until a sufficient amount of the whey has been drained. The container is then returned to its original position, and the top plate and top blades are removed. A drain plate and tray assembly are then placed on the top surface of the cheese, and the entire container is inverted. The bottom V shaped blades, which are now at the top of the container, are then removed. The curd is then subjected to pressure and vacuum to cause knitting together of the portions of the curd which have been separated by the V shaped blades.

The method proposed in the Krueger and Leitner patents has several important disadvantages. First, it has been discovered that the compressed curd in the center section between the V shaped blades tends to pull out each time a set of blades is removed. The chunk of curd must be placed back into the container by hand, which is messy, inconvenient, and generally undesirable. Second, the method of the Krueger and Leitner patents requires a substantial capital investment for two sets of blades per container, for blade insertion apparatus, and for draining and inverting apparatus. Third, the Krueger and Leitner method requires draining for a substantial period of time with the container turned by ninety degrees.

The removal of whey from cheese curd during the production of natural cheese by means of perforated members has been known for many years. For example, U.S. Pat. No. 1,418,242 by Fieldman, U.S. Pat. No. 3,891,783 by Robertson and Bysouth, and U.S. Pat. No. 4,018,145 by Hensel all describe draining of whey from cheese curd by use of perforated members of various forms.

SUMMARY OF THE INVENTION

The present invention is an improved apparatus and method for manufacturing blocks of cheese from curd. The apparatus employed in the method includes a container having a removable bottom, side walls, and an essentially open top. A plurality of upstanding perforated tapered posts extend from the removable bottom to substantially the desired height of the curd after compacting. The upstanding perforated posts are spaced longitudinally and laterally from one another such that the curd surrounds each post when the container is filled with curd. An opening is provided beneath each post to enable the whey to drain from the interior of the post.

The apparatus further includes means for applying pressure downward to the curd in the container to compact the curd and cause drainage through the upstanding perforated posts. After the compacting and draining is completed, the container is inverted so that the inverted upstanding perforated tapered posts may be withdrawn from the curd. The curd surrounding each perforated post knits together to provide a cheese block of uniform texture.

The present invention provides a simpler, yet effective method of manufacturing large blocks of cheese from curd, while providing the necessary draining of whey from the curd during compressing of the curd. The use of upstanding perforated tapered posts which extend substantially the entire desired height of the compressed curd avoids the use of V shaped blades which must be inserted downward into the curd, and avoids the tilting of the container in order to drain whey. In addition, removal of the tapered posts of the present invention does not result in removal of a center chunk of curd, as is the tendency with the prior art V shaped blades.

BRIEF DESCRIPTION OF THE DRAWINGS

FIG. 4 is a perspective view of the removable bottom, drain tray and upstanding perforated tapered posts of the cheese making apparatus of the present invention.

FIG. 5 is a cross-sectional view of an upstanding perforated tapered post along section 5—5 of FIG. 4.

FIG. 6 is a sectional view of an upstanding perforated tapered post along section 6—6 of FIG. 5.

DETAILED DESCRIPTION OF THE PREFERRED EMBODIMENTS

Figure 1A:
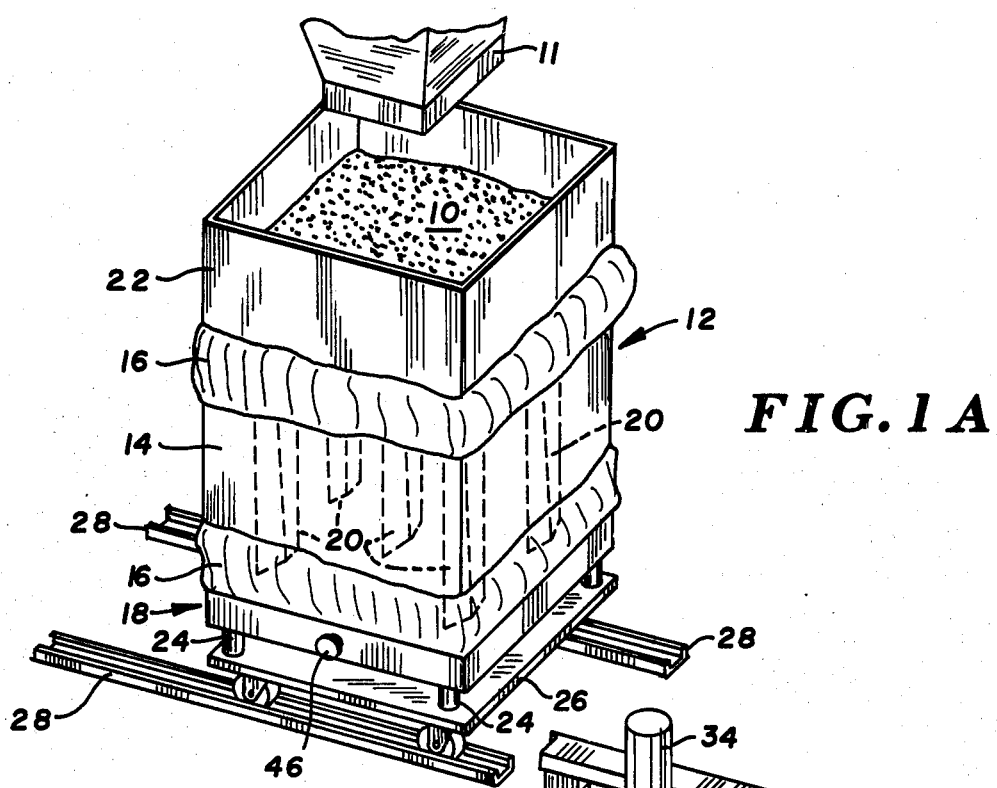
FIGS. 1A–1E illustrate the cheese manufacturing method of the present invention.

FIGS. 1A–1E illustrate the cheese making method of the present invention, in which large blocks of natural cheese are made from curd. FIG. 1A shows the filling and weighing station, where curd 10 is discharged from outlet 11 into rectangular container 12. Rectangular container 12 has four separate upstanding side walls 14, which are made of wood or metal. Side walls 14 are lined with a flexible, removable liner 16, which is usually a plastic material such as polyethylene, and which prevents curd from sticking to the inner surfaces of side walls 14. Flexible bands or straps 17 (shown in FIG. 1B) surround side walls 14 and hold side walls 14 in assembled position. Container 12 has a removable bottom and drain tray assembly 18. Extending upwardly from removable bottom and drain tray 18 are a plurality of upstanding perforated tapered posts 20, which are shown in phantom in FIG. 1A and in full lines in FIG. 4. These upstanding perforated tapered posts 20 extend upwardly from the bottom to essentially the desired height of the final cheese block. Posts 20 have a greater cross-section at their bottom than at their top, and are spaced from one another both longitudinally and laterally within container 12. As shown in FIG. 1A, tapered posts 20 are surrounded by curd 10 as it is discharged from outlet 11 and it fills container 12 and filler extension 22. Whey begins to drain from curd 10, through posts 20 and into bottom and drain tray assembly 18 as container 12 begins to be filled with curd 10.

In order to provide draining of whey throughout the entire container 12, perforated tapered posts 20, as best shown in FIG. 4, are distributed or spaced essentially uniformly within container 12. In the preferred embodiment, in which five tapered posts 20 are used, one tapered post 20 is positioned at the center of each of four quandrants of the container, and the fifth tapered post 20 is located in the center of the container (and therefore at the intersection of the four quandrants). In this way, the tapered posts 20 are positioned with respect to the walls of container 12 and with respect to one another so that whey is drained from throughout the entire curd 10.

Filler extension 22 is placed above container 12 and has essentially the same dimensions. The purpose of the filler extension 22 is to guide curd 10 into container 14 during the filling process. In addition, filler extension 22 continues to provide support of curd 10 until after curd 10 is compressed. Since there is a significant reduction in the volume of curd 10 as a result of compression, it is necessary to begin with a volume of curd greater than the volume of container 12 in order to completely fill the volume of container 12 after compression.

Bottom and drain tray assembly 18 is supported by supports 24 above a wheeled dolly 26. Dolly 26 rolls in rails 28, which permit movement of the container 12 from station-to-station in the manufacturing process.

Figure 1B:
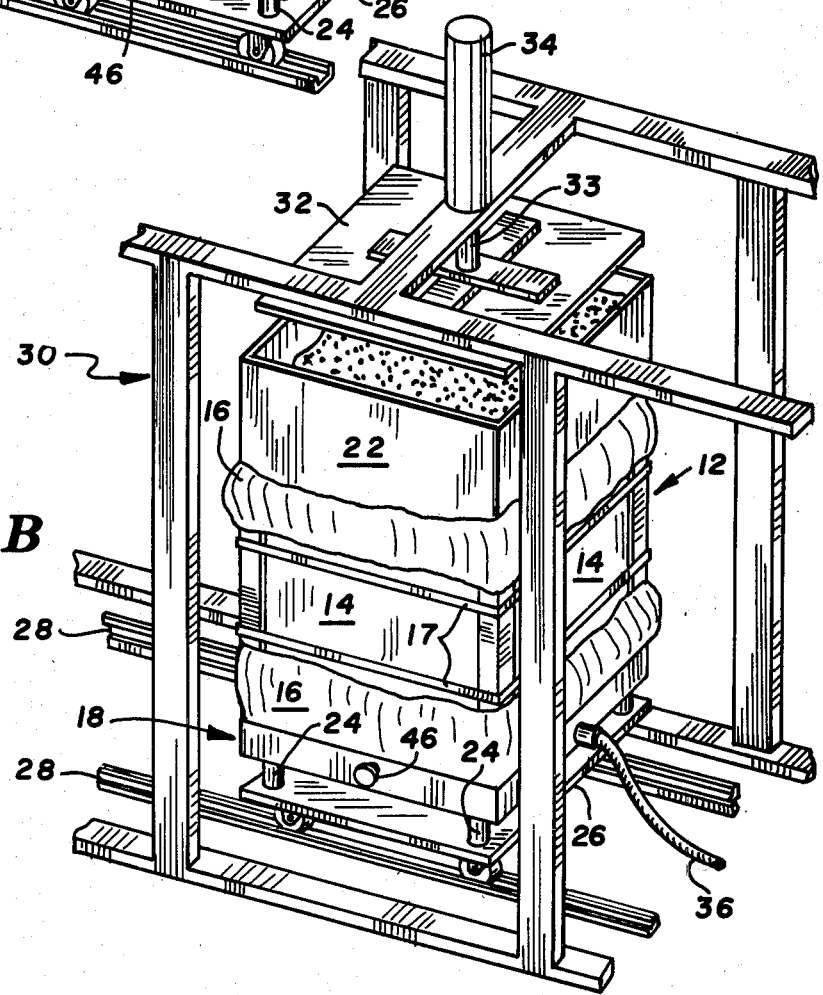

FIG. 1B shows container 12 after it has been moved to the pressing and whey removal station. At this station, a press assembly including pressure plate 32 supported by a frame 30 apply downward pressure to the top surface of curd 10. Plate 32 is inserted into filler extension 22 and moves downward to compress curd 10 to the desired height of the cheese block. In a preferred embodiment, plate 32 is driven by a piston rod 33 of an air cylinder 34 having a stop (not shown) which prevents it from reaching a depth where it would contact upstanding posts 20. Instead, plate 32 is stopped at a position just above the tops of posts 20, so that posts 20 extend essentially the entire height of the compressed curd. This desired compressed curd height is selected so that the entire curd is within the container 12.

During the pressing procedure, whey is drained from curd 10 through the perforations in upstanding posts 20. The whey drains through the posts downward through the bottom to drain tray assembly 18, and is drained away through vacuum line 36.

After pressing and whey removal is completed, plate 32 is withdrawn from container 12, and filler extension 22 is removed. As shown in FIG. 1C, drain pan 38, second caster dolly 39, and rail sections 40a and 40b are placed on top of container 12, and container 12 is moved to the inverting station. At this station, inverting apparatus 41 inverts container 12 by 180 degrees so that drain pan 38, wheeled dolly 39, and rail sections 40a and 40b are placed at the bottom of container 12, and bottom and drain tray assembly 18, dolly 26, and rail sections 28' are placed at the top of container 12. As shown in FIG. 1C, inverting apparatus 41 incldues air motor 42, which pivots container 12 by 180 degrees about pivot axis 43.

Figure 1D:
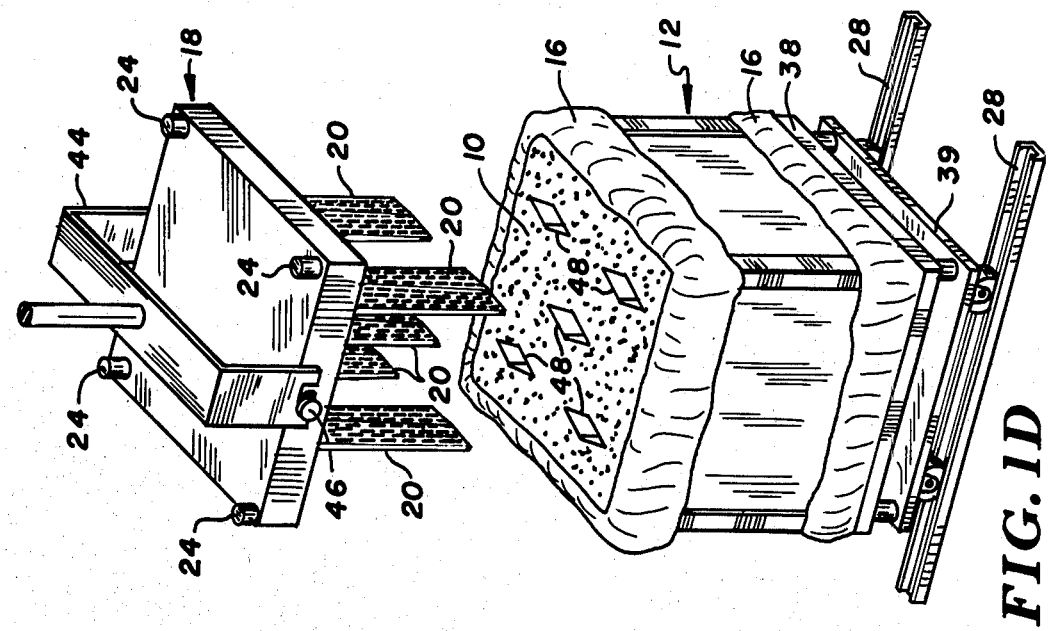
Figure 1C:
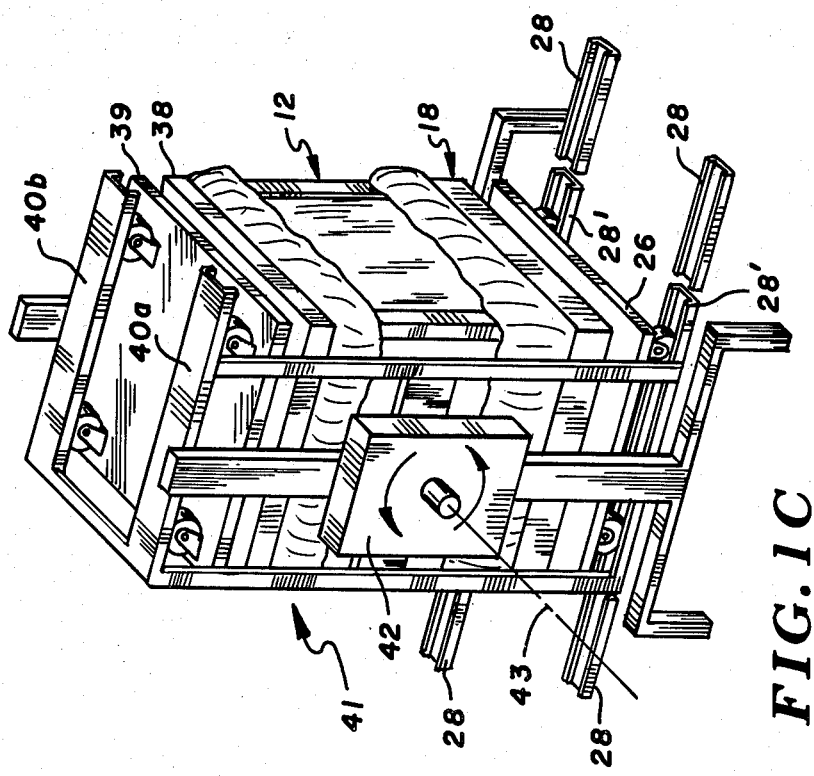

After container 12 has been inverted, it is transported along rails 28 to a post removal station shown in FIG. 1D. At this station, lifting rig 44 engages pins 46 on opposite sides of bottom and drain tray assembly 18. Lifting rig 44 pulls bottom and drain tray 18 and posts 20 upward, thereby withdrawing posts 20 from compressed curd 10. As shown in FIG. 1D, the result of removing the posts 20 is a plurality of essentially diamond-shaped tapered openings 48 which extend downward into compressed curd 10. These diamond-shaped openings 48 are relatively small with respect to the overall size of the curd 10, and will knit together during subsequent processing, leaving no noticeable residual marks on the curd 10.

Figure 1E:
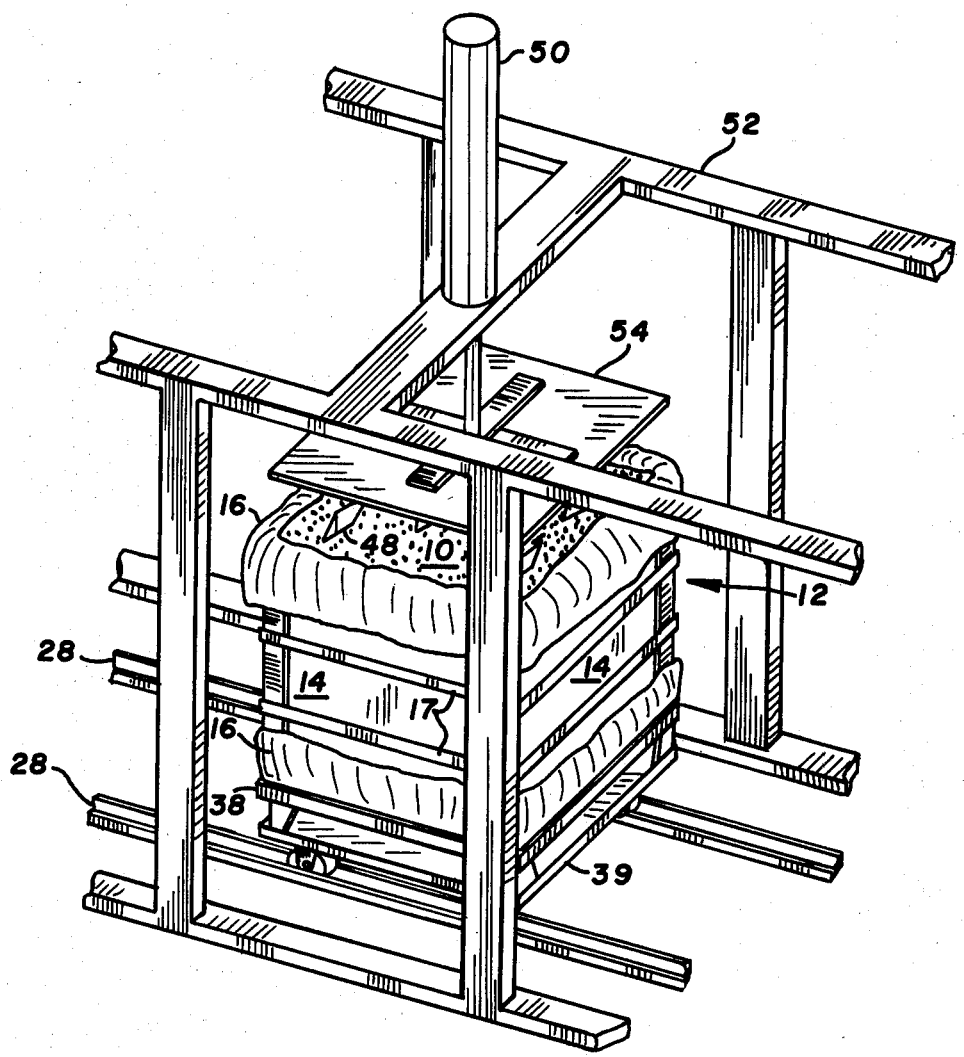

In FIG. 1E, container 12 has been transported on dolly 39 along rails 28 to a second pressing station. At this second pressing station, air ram 50 supported on frame 52 presses plate 54 downward on the top surface of curd 10. The result of this pressure is to cause knitting together of the curd 10, thereby resulting in a block of cheese of uniform texture.

The present invention, as illustrated in FIGS. 1A–1E, has significant advantages. First, the use of posts 20 which are laterally and longitudinally spaced from one another eliminates the problem of curd being pulled out of container 12 during removal of posts 20. In the prior art Krueger et al method, curd in the center portion between the V-shaped blades tends to pull out of the container when the V-shaped blades are removed.

Second, the present invention requires fewer steps and less equipment than the prior art Krueger et al method. As a result, the cost of implementing the present invention in a cheese manufacturing operation is significantly less than a comparable system using the Krueger et al method. For example, the present invention requires no tilting of container 12 in order to drain whey through upstanding posts 20. This is unlike the Krueger et al method, which requires that the container be tilted by 90 degrees in order to permit draining of whey. In addition, because posts 20 extend upward from bottom and drain tray assembly 18 to essentially the entire height of the desired cheese block, there is no need for blades, and certainly not a set which is forced downwardly into the curd, as required in the Krueger et al method.

Third, the use of posts 20 which extend upward to essentially the entire height of the desired cheese block permits draining of whey immediately as the curd 10 is being filled into container 12. As a result, in the preferred embodiments of the present invention posts 20 are maintained within the curd for a time period of only about 15 to 25 minutes from the time that the filling of container 12 commences until posts 20 are removed. This not only results in a shorter draining process, but also eliminates the possibility of residual marks in the cheese or curd resulting from the presence of the posts.

Fourth, no sharp edges are required on posts 20, since curd 10 is filled around posts 20, and posts 20 are not blades which are inserted into curd 10. The elimination of sharp edges is an important safety factor.

Fifth, the generally diamond-shaped cross-section of posts 20 provides efficient drainage, since whey is accepted from varying angles around each post. In addition, the diamond-shaped cross-section of posts 20 leaves diamond-shaped openings in the curd when the posts are removed. It has been found that these diamond-shaped openings result in efficient knitting together of the curd with no residual marks.

Sixth, the openings in curd 10 after withdrawal of posts 20 are wide only at one surface, the top surface. In fact, there is no separation of curd at the bottom surface. This is helpful in achieving knitting together of the cheese during the second pressing stage.

Figure 2:
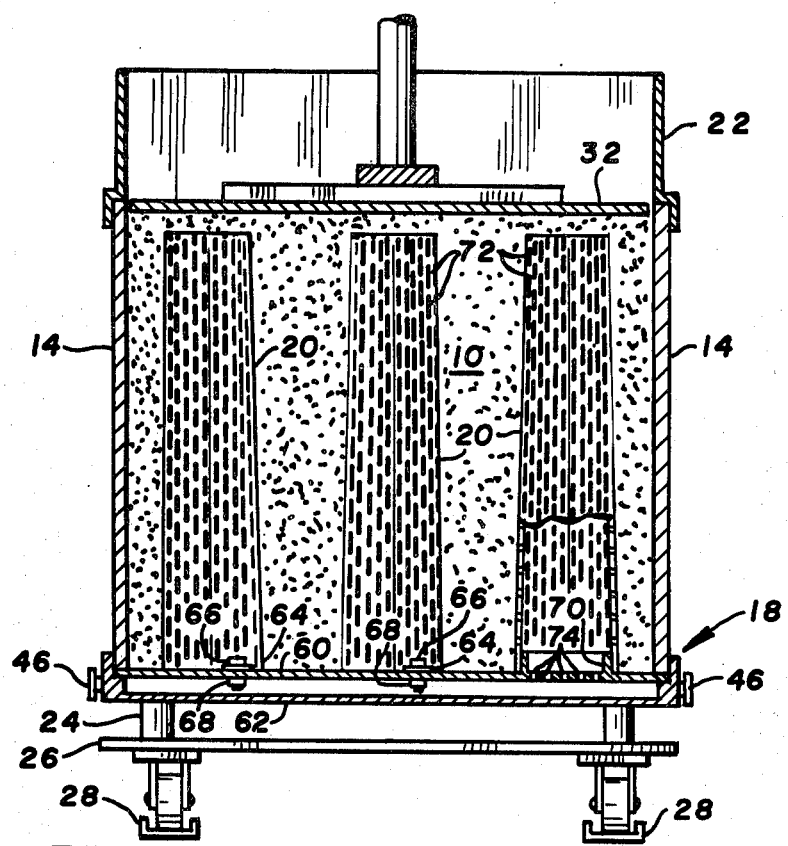
FIG. 2 is a cross-sectional front view of the cheese making apparatus of the present invention during the initial pressing and draining operation.
Figure 3:
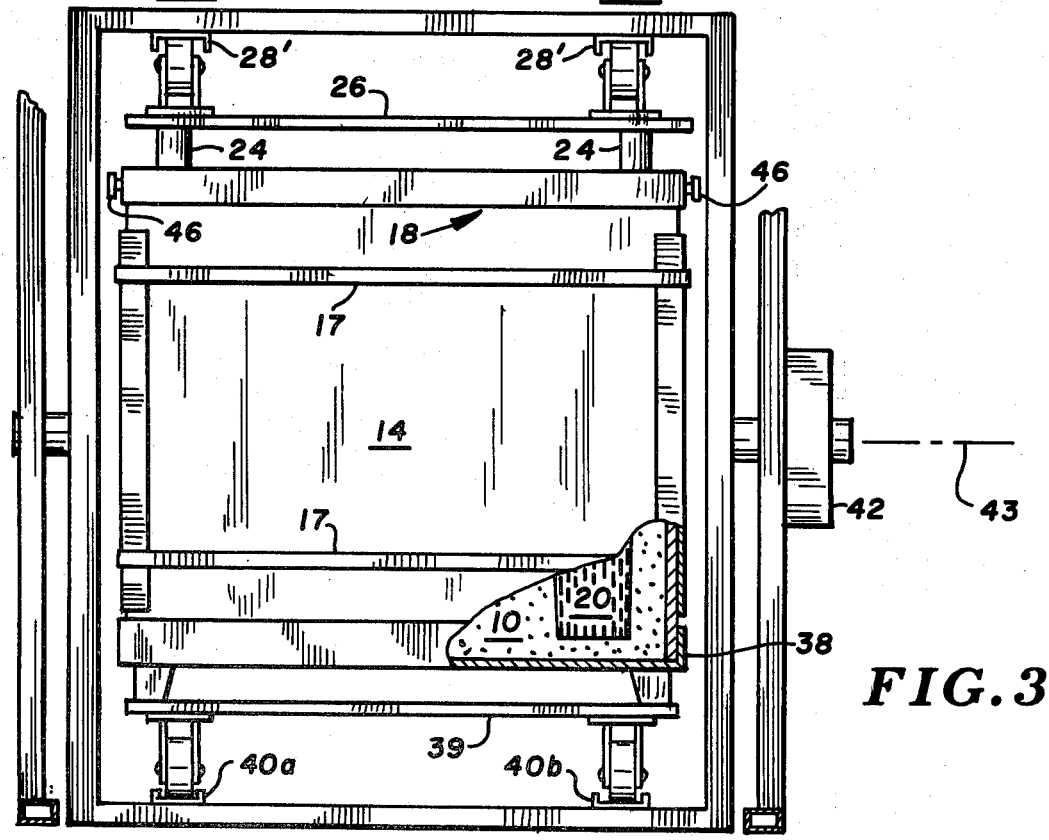
FIG. 3 is a front view of the cheese making apparatus after the container has been inverted.

FIGS. 2 and 3 show container 12 in greater detail at different stages in the cheese manufacturing process. FIG. 2 is a cross-sectional front view of container 12 during the first pressing operation. Plate 32 is shown at its lower press limit. It can be seen that plate 32 is stopped just above the tops of posts 20, so that there is no danger of damage to posts 20 during pressing.

As shown in FIG. 2, bottom and drain tray assembly 18 includes a removable bottom 60 and drain tray 62. Upstanding posts 20 are attached to bottom plate 60 by means of mounting tabs 64, bolts 66, and nuts 68. Posts 20, therefore, may be removed easily from bottom 60 for cleaning. In FIG. 2, one of the posts 20 is partially broken away to show alignment ribs 70, which extend upward from bottom 60 and which are located inside of the bottom edge of posts 20. Ribs 70 align posts 20 and also provide support to prevent posts 20 from collapsing during pressing.

During the first pressing step, whey is drained from curd 10 through slot-like apertures 72 in posts 20. The whey travels downward through the interior of posts 20, through openings 74 in bottom 60, and into drain tray 62. Openings 74 in bottom 60 are located within the area covered by posts 20. The collected whey then is drained from drain tray 62 through vacuum line 36 (shown in FIGS. 1B and 4).

FIG. 3 is a front view of the apparatus of the present invention at the inverting station. As shown in FIG. 3, container 12 has been inverted so that posts 20 are extending downward from bottom 60, and drain pan 38 and dolly 39 are now at the bottom of container 12. Bottom and drain tray assembly 18, and dolly 26 are at the top of container 12 after the inversion, as shown in FIG. 3.

FIGS. 4, 5 and 6 show the upstanding tapered perforated posts of the present invention in greater detail. As shown in FIGS. 4, 5, and 6, posts 20 are attached to bottom 60 by means of mounting tabs 64, bolts 66, and nuts 68. As shown in the Figures, two mounting tabs 64 are attached to each of the posts 20 at opposite ends and opposite sides of posts 20. Bolts 66 project downward through the holes in tabs 64 and through corresponding holes in bottom 60 and nuts 68 are threaded onto the threaded portions of bolts 66 which extend below bottom 60.

As shown in the Figures, slot-like apertures 72 cover essentially the entire surfaces of posts 20. The spacing of the slot-like apertures 72 is as close as possible to provide maximum drainage, while still permitting sufficient structural strength of posts 20. In one successful embodiment of the present invention, posts 20 were formed from #3 gauge stainless steel, and apertures 72 were $\frac{1}{8} \times \frac{3}{4}$ inch round end slots on 5/16 inch side stagger centers. The length of the slots was oriented essentially parallel to the vertical axis of posts 20. As shown in FIGS. 4-6, posts 20 are tapered upward (i.e. they have their largest cross-section at the bottom and their smallest cross-section at the top). This permits easy removal of posts 20 after container 12 has been inverted, without damage to curd 10.

It can also be seen from FIGS. 4-6 that posts 20 have an essentially diamond-shaped cross-section with the corners of the diamond being curved or blunted. Similarly, the top 78 of each post 20 is flat or blunt. The use of curved or blunt surfaces eliminates the danger of injury which would be possible if sharp blades were used. It is not necessary to provide sharp edges on posts 20, since the curd is filled around the posts, and the posts are never pushed or inserted into the curd.

FIGS. 5 and 6 further illustrate alignment ribs 70, which were also shown in FIG. 2. Ribs 70 align each post 20 in proper position with respect to drain holes 74, and also provide structural support to the base portion of posts 20 to prevent collapse of post 20 during the pressing operation.

Figure 7:
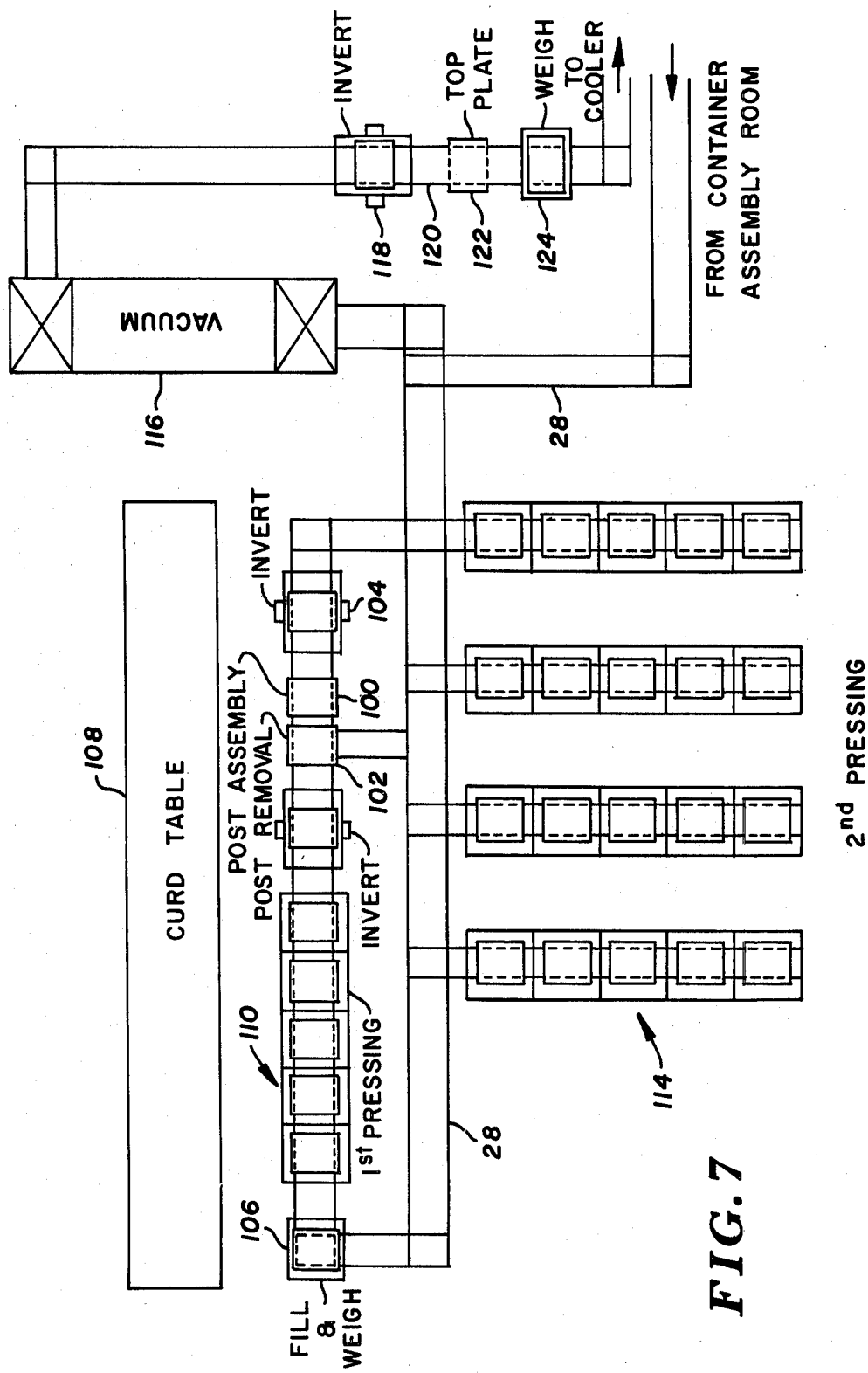
FIG. 7 schematically shows a cheese manufacturing operation utilizing the apparatus and method of the present invention.

FIG. 7 is a schematic diagram illustrating the implementation of the method of the present invention in a cheese manufacturing operation. Empty containers like container 12 shown in FIGS. 1A-1E are assembled and placed on a dolly in a back room (not shown). The containers move from the back room, along track 28, to post assembly station 100. This station 100 is next to post removal station 102, which is illustrated in FIG. 1D. As posts 20 and attached bottom and drain tray assembly 18 are removed from a container at post removal station 102, they are immediately moved by lifting rig 44 (shown in FIG. 1D) to post assembly station 100, and inserted downward into the empty container.

As soon as the posts 20 and the attached bottom and drain tray assembly 18 are inserted into the empty container at station 100, dolly 26 (shown in FIG. 1A) is placed on the top of the container. The container is then moved to inverting station 104, where the entire assembly is inverted so that dolly 26 is at the bottom of the assembly, and posts 20 are extending upward from the bottom of container 12. After inversion, the dolly which is now at the top of the container is removed, and filler extension 22 (shown in FIG. 1A) is placed at the top of container 12.

Container 12 is now ready to receive curd, and is moved along track 28 to filling and weighing station 106, which is illustrated in FIG. 1A. Curd 10 from curd table 108 is filled into container 12 and filling station 106, the filled container is weighed, and is moved to first pressing station 110, which is illustrated in FIG. 1B.

In one preferred embodiment of the present invention, curd table 108 produces curd in amounts sufficient to fill five containers at a time. This embodiment is illustrated in FIG 7, in which pressing station 110 includes five pressing assemblies to handle five filled containers simultaneously. It is at station 110 that vacuum line 36 is connected to assist in the whey removal.

After the first pressing operation is complete, pressing plate 32 shown in FIG. 1B is withdrawn, and filler extension 22 is removed. Drain pan 38, dolly 39, and rail sections 40a and 40b (shown in FIG. 1C) are placed on top of container 12, and each container is moved in sequence to inverting station 112 (illustrated in FIG. 1C).

At inverting station 112, container 12 is inverted so that dolly 39 is at the bottom. The container is then advanced to post removal station 102, which is illustrated in FIG. 1D. Between inverter station 112 and post removal station 102, dolly 26 (which is now at the top of the assembly) is removed.

After posts 20 are withdrawn from curd 10 at post removal station 102, a press plate is placed on top of curd 10 and container 12 is moved to second pressing station 114 (at the bottom of FIG. 7), which is illustrated in FIG. 1E. At this station, pressure is applied downward on curd 10 to close substantially the openings left by removal of posts 20, and to cause a small amount of additional draining of whey. In one preferred embodiment curd 10 remains under pressure at second pressing station 114 for about four hours.

After the second pressing operation is completed, the containers are moved to vacuum station 116, where they are subjected to vacuum for about 45 minutes, which causes the openings to close completely and the curd to knit together. At the end of the vacuum treatment, the assembly advances to inverter station 118, where the container is inverted and placed on conveyor apparatus 120. Drain pan 38 and dolly 39 are then removed from the top of container 12. A top lid is pressed onto the top surface of the container at lid press station 122, and the container is weighed at scale station 124. The filled containers are then advanced to a cooler for cooling and storage.

As shown in FIG. 7, the present invention is well suited to large-scale manufacturing processes. In the particular embodiment shown in FIG. 7, five containers are filled and then pressed at first pressing station 110 at the same time. This number, of course, may vary depending upon the desired production of the facility. Similarly, the number of presses at the second pressing station 114 varies depending on the capacity of curd table 108 and first pressing station 110.

In conclusion, the cheese making method of the present invention represent a significant improvement over the prior art methods. Large blocks of natural cheese may be formed using the present invention, without the necessity of numerous steps required in the prior art. In particular, there is no requirement of forcing blades into the curd after it has been deposited in the container; there is no requirement of tilting the container during the draining process; and there is no need for sharp edges. In addition, the problem of chunks of curd being pulled out is eliminated with the present invention.

Although the present invention has been described with reference to preferred embodiments, workers skilled in the art will recognize that changes may be made in form and detail without departing from the spirit and scope of the invention.

What is claimed is:

1. A method of manufacturing cheese from curd, the method comprising:

filling the curd into a container having a removable bottom, side walls, and an essentially open top, and having a plurality of upstanding perforated tapered posts secured to and extending and tapering from the bottom to substantially a desired height of the curd after compacting, the upstanding perforated tapered posts being essentially uniformly distributed within the container and being spaced longitudinally and laterally from one another and from the sidewalls of the container along their entire height such that the curd completely surrounds the upstanding perforated tapered posts as the container is filled, each of said tapered posts having an essentially diamond-shaped cross-section in which the cross-sectional length is substantially greater than the cross-sectional width;

inserting a pressure plate into the top of the container over the curd, applying pressure downwardly to the pressure plate and hence to the curd in the container substantially parallel to the longitudinal axes of the posts to compact the curd and to cause draining through the upstanding perforated tapered posts through openings in the bottom to whey collecting means beneath said posts;

continuing such downward pressure until the under surface of the pressure plate is slightly spaced from the tops of the tapered posts so that draining of the whey is accomplished without the need of inserting probes from above;

inverting the container with the compacted curd therein;

withdrawing the bottom and the inverted upstanding perforated posts secured thereto from the curd, and applying pressure downwardly to the curd to cause substantial closing of the downwardly extending essentially diamond shaped openings produced as a result of withdrawing the inverted upstanding perforated posts to permit knitting together of the curd to provide a cheese block of uniform texture.

2. The method of claim 1 and further comprising:

subjecting the curd to vacuum after applying pressure downward to cause knitting together of the curd.

3. The method of claim 1 wherein the upstanding perforated tapered posts include a post essentially centered in each of four quadrants within the container and a post positioned essentially at the intersection of the four quadrants.

* * * * *